Oct. 23, 1934.  C. D. BURNEY  1,978,293
MOTOR ROAD VEHICLE HEADLAMP
Original Filed Aug. 10, 1929
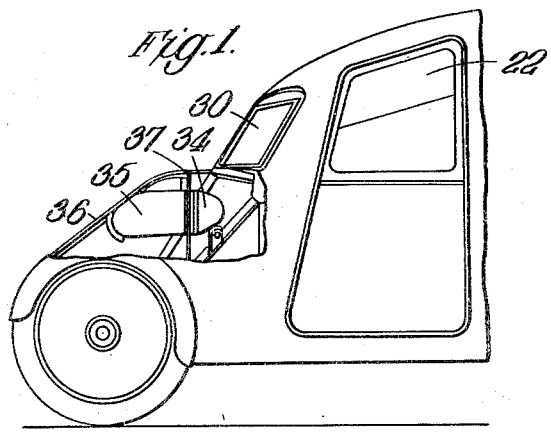
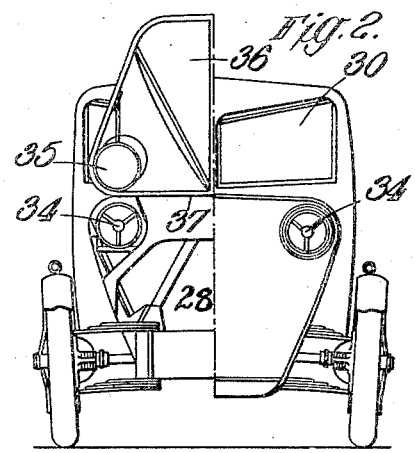
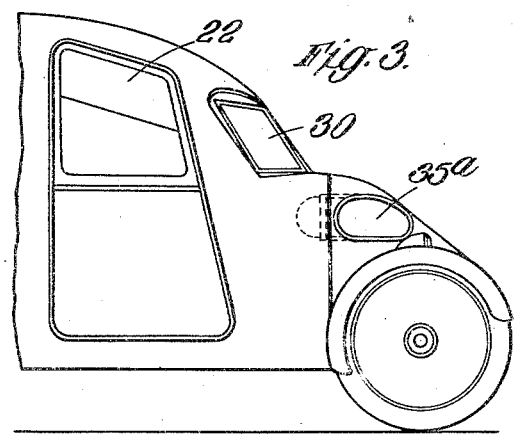

Patented Oct. 23, 1934

1,978,293

UNITED STATES PATENT OFFICE 1,978,293

MOTOR ROAD VEHICLE HEADLAMP

Charles Denniston Burney, Westminster, England

Original application August 10, 1929, Serial No. 384,946. Divided and this application December 22, 1931, Serial No. 582,607. In Great Britain September 6, 1928

3 Claims. (Cl. 240—7.1)

This invention relates to head lamps for motor road vehicles, the invention consisting in an improved method of arranging the head lamps inside the body portion of the vehicle at the front portion thereof.

The invention is illustrated in the accompanying drawing, in which:

Figure 1 is a side elevation of the front portion of a motor road vehicle fitted with head lamps constructed according to the present invention, a hood or cowling provided at the nose of the car being shown broken away so as to illustrate the tubular passage through which the light from the head lamp is projected.

Figure 2 is a front view of the vehicle showing on the left-hand side the aforesaid hood or cowling in the raised position, and on the right-hand side the said hood or cowling in its normal lowered position.

Figure 3 is a side elevation of the front of the vehicle with the hood or cowling in the lower position. 34, 34, are head lamps which are situated at the inner end of a tube or passage 35 formed in a hood or cowling portion 36 which is pivotally attached to the front of the car at the point 37. One side of the outer end of each tube or passage 35 is cut away laterally, and the hood or cowling contiguous to the outer end of the passage 35 is also cut away laterally so as to provide an opening through which the light from each head lamp 34 is projected, not only forwardly, but laterally, thus enabling sign posts etc. on the road to be read more easily than heretofore. The aforesaid opening in the hood or cowling portion 36 is provided with a glazed portion 35a. In order to obtain access to the lamps 34, 34, the hood or cowling portion 36 can be raised into the position shown on the left-hand side of Figure 2.

The invention is shown applied to a motor road vehicle of the kind in which the driving unit is located at the rear of the vehicle in the vicinity of the axis of the rear wheels, a vehicle of this type being shown in my United States application No. 384,946 filed August 10, 1929, now Patent No. 1,903,693 issued April 11, 1933, of which this application is a division. The space beneath the hood or cowling 36 may be employed for the accommodation of a spare wheel. 30 is the wind screen and 22 one of the side windows of the car. By the terms "hood" or "cowling" is meant generally that portion of the vehicle body forward of the windshield.

I claim:

1. In a motor road vehicle comprising a streamlined front hood or cowling having side walls convergent toward the front of the vehicle, the combination of forwardly faced headlamps disposed entirely within the hood or cowling on opposite sides of the longitudinal center line of the latter, said convergent side walls being provided with openings in front of the headlamps through which the beams of the latter are projected, a substantially tubular element extending between each lamp and its associated opening, and light transmitting plates closing said openings and substantially preserving the streamline contours of said side walls.

2. In a motor road vehicle, a body having a hinged hood or cowling portion at its front end, forwardly facing transversely spaced head lamps fixed within said body and spaced rearwardly from the wall of the hood or cowling, tubular reflecting elements extending forwardly from said headlamps to the wall of the hood or cowling, openings in the wall of said hood or cowling which register with the forward ends of said tubular elements when the hood or cowling is in closed position, and light transmitting coverings for said openings flush with and conforming to the contours of said hood or cowling.

3. In a motor road vehicle having a streamlined body, a front end having forwardly convergent side walls, forwardly facing transversely spaced headlamps fixed within said body and spaced rearwardly from the wall of the body at the front end, tubular reflecting elements extending forwardly from said headlamps to the wall of the body at the front end, openings in the side walls of said front end which register with the forward ends of said tubular elements, and light transmitting coverings for said openings flush with and conforming to the contours of the walls of said body at the front end.

CHARLES DENNISTON BURNEY.